United States Patent
Im et al.

(10) Patent No.: US 9,405,159 B2
(45) Date of Patent: Aug. 2, 2016

(54) TOUCH LIQUID CRYSTAL DISPLAY DEVICE, LIQUID CRYSTAL DISPLAY PANEL, ARRAY SUBSTRATE AND COLOR FILM SUBSTRATE

(71) Applicant: BOE Technology Group Co., Ltd., Beijing (CN)

(72) Inventors: Yunsik Im, Beijing (CN); Teng Ye, Beijing (CN); Lijun Zhao, Beijing (CN); Yaohu Liu, Beijing (CN)

(73) Assignee: BOE TECHNOLOGY GROUP CO., LTD, Beijing (CN)

( * ) Notice: Subject to any disclaimer, the term of this patent is extended or adjusted under 35 U.S.C. 154(b) by 0 days.

(21) Appl. No.: 13/963,198

(22) Filed: Aug. 9, 2013

(65) Prior Publication Data

US 2014/0071355 A1    Mar. 13, 2014

(30) Foreign Application Priority Data

Sep. 7, 2012 (CN) .......................... 2012 1 0330582

(51) Int. Cl.
*G02F 1/1343* (2006.01)
*G02F 1/1345* (2006.01)
*G02F 1/1333* (2006.01)
*G02F 1/1362* (2006.01)

(52) U.S. Cl.
CPC ........ *G02F 1/13439* (2013.01); *G02F 1/13338* (2013.01); *G02F 1/13454* (2013.01); *G02F 2001/133334* (2013.01); *G02F 2001/136218* (2013.01)

(58) Field of Classification Search
None
See application file for complete search history.

(56) References Cited

U.S. PATENT DOCUMENTS

| 2009/0067112 A1* | 3/2009 | Takabayashi ....... G02F 1/13452 361/220 |
| 2011/0304564 A1* | 12/2011 | Kim ........................ G06F 3/044 345/173 |
| 2011/0310059 A1* | 12/2011 | Miyamoto ............ G06F 3/0412 345/174 |

FOREIGN PATENT DOCUMENTS

| CN | 201107503 Y | 8/2008 |
| CN | 102830848 A * | 12/2012 .............. G02F 1/133 |

(Continued)

OTHER PUBLICATIONS

European Search Report for European Patent Application No. 13183301.4 dated Dec. 4, 2013, 8pgs.

(Continued)

*Primary Examiner* — Edward Glick
*Assistant Examiner* — Anthony G Quash

(57) ABSTRACT

The present disclosure provides a touch liquid crystal display device, a liquid crystal display panel, an array substrate and a color film substrate, and belongs to the field of liquid crystal display. The touch liquid crystal display panel includes an array substrate and a color film substrate, on said array substrate is formed a GOA circuit, and at the outer side of said color film substrate is formed a touch signal transmission line. The touch liquid crystal display panel further comprises a shielding electrode located between said GOA circuit and said touch signal transmission line, said shielding electrode being used for shielding the interference caused by the clock signal of said GOA circuit to the touch sensing signal on said touch signal transmission line. The present disclosure can reduce the interference caused by the clock signal of said GOA circuit to the touch sensing signal on said touch signal transmission line.

14 Claims, 2 Drawing Sheets

(56) References Cited

FOREIGN PATENT DOCUMENTS

| CN | 202771135 U | 3/2013 |
| EP | 1422601 A1 | 5/2004 |

OTHER PUBLICATIONS

Second Office Action (Chinese language) issued by the Chinese Patent Office for Chinese Patent Application No. 201210330582.0, issued on Feb. 16, 2015; 7 pages.

English translation of Second Office Action issued by the Chinese Patent Office for Chinese Patent Application No. 201210330582.0, issued on Feb. 16, 2015; 6 pages.

English language abstract of CN202771135U listed above, 1 page.

First Office Action (Chinese language) issued by State Intellectual Property Office of People's Republic of China, in Chinese application No. 201210330582.0, dated Oct. 24, 2014, 8 pages.

English translation of First Office Action issued by State Intellectual Property Office of People's Republic of China, in Chinese application No. 201210330582.0, dated Oct. 24, 2014, 8 pages.

English abstract of CN201107503Y dated Aug. 27, 2008.

* cited by examiner

TOUCH LIQUID CRYSTAL DISPLAY DEVICE, LIQUID CRYSTAL DISPLAY PANEL, ARRAY SUBSTRATE AND COLOR FILM SUBSTRATE

CROSS REFERENCE TO RELATED APPLICATIONS

This application claims priority from Chinese National Application No. 201210330582.0, filed on Sep. 7, 2012, the contents of which are incorporated herein by reference.

FIELD OF THE INVENTION

The present disclosure relates to the field of liquid crystal display technology, and in particular to a touch liquid crystal display device, a liquid crystal display panel, an array substrate and a color film substrate.

BACKGROUND

Currently the touch screen in the market includes an add on mode touch screen and a integrated touch screen, and the integrated touch screen is a touch screen into which a touchpad is integrated at the same time when the liquid crystal panel is manufactured. There are two kinds of integration approaches for the integrated touch screen, one is to integrate the touchpad functionality at the outer side of the color film substrate of the liquid crystal panel (also referred to on-cell integration approach), and the other is to integrate the touchpad functionality between the color film substrate and the array substrate of the liquid crystal panel, generally directly at the inner side of the color film substrate (also referred to in-cell integration approach).

FIG. 1 is a schematic diagram of the structure of a touch liquid crystal display panel of an on-cell integration approach. As shown in FIG. 1, said touch liquid crystal display panel includes an array substrate 1 and a color film substrate 2, a touch electrode unit 21 and a touch signal transmission line 22 are formed at the outer side of said color film substrate 2, and said touch signal transmission line 22 is located in the non-display area of said color film substrate 2.

In some liquid crystal displays, the gate line driving circuit is made on the array substrate, and this kind of gate line driving circuit is called a Gate on Array (GOA) circuit. The application of GOA technology can reduce the production process procedures and the product process costs, and improve the integration degree of the liquid crystal panel. Corresponding to FIG. 1, on said array substrate 1 is formed a GOA circuit 11, and said GOA circuit 11 is formed in the non-display area of the array substrate 1.

For a liquid crystal display panel in an Advanced Super Dimension Switch (ADS) mode, there are no common electrodes on its color film substrate, both the common electrodes and the pixel electrodes are made on the array substrate, and the fringe field effect between the common electrode and the pixel electrode is utilized to drive the liquid crystal for display. In this way, for a touch liquid crystal display panel in the ADS mode, the clock signal of its GOA circuit will cause interference to the touch sensing signal on the touch signal transmission line, resulting in abnormality in the function of touch screen.

SUMMARY

Embodiments of the present disclosure provide a touch liquid crystal display device, a liquid crystal display panel, an array substrate and a color film substrate, which can reduce the interference caused by the clock signal of the GOA circuit to the touch sensing signal on the touch signal transmission line.

To solve the above technical problem, the present disclosure provides a technical solution as follows:

A touch liquid crystal display panel comprising: an array substrate and a color film substrate, on said array substrate is formed a GOA circuit, and at the outer side of said color film substrate is formed a touch signal transmission line, the touch liquid crystal display panel further comprises:

a shielding electrode located between said GOA circuit and said touch signal transmission line, said shielding electrode being used for shielding the interference caused by the clock signal of said GOA circuit to the touch sensing signal on said touch signal transmission line.

The above touch liquid crystal display panel, wherein said shielding electrode is located on said array substrate, and covers said GOA circuits.

The above touch liquid crystal display panel, wherein
said shielding electrode is grounded; or
said shielding electrode is connected to the common electrode on said array substrate.

The above touch liquid crystal display panel, wherein said shielding electrode is located at the outer side of said color film substrate and underneath said touch signal transmission line.

The above touch liquid crystal display panel, wherein
said shielding electrode is grounded; or
said shielding electrode is externally connected to the common electrode.

An array substrate being used for a touch liquid crystal display panel, said touch liquid crystal display panel comprises said array substrate and the color film substrate, on said array substrate is formed a GOA circuit, at the outer side of said color film substrate is formed a touch sensing line, said array substrate further comprises:

a shielding electrode covering said GOA circuit, said shielding electrode being used for shielding the interference caused by the clock signal of said GOA circuit to the touch sensing signal on said touch signal transmission line.

The above array substrate, wherein
said shielding electrode is grounded; or
said shielding electrode is connected to the common electrode on said array substrate.

A color film substrate being used for a touch liquid crystal display panel, said touch liquid crystal display panel comprises the array substrate and said color film substrate, on said array substrate is formed a GOA circuit, at the outer side of said color film substrate is formed a touch signal transmission line, said color film substrate further comprises:

a shielding electrode located at the outer side of said color film substrate and underneath said touch signal transmission line, said shielding electrode being used for shielding the interference caused by the clock signal of said GOA circuit to the touch sensing signal on said touch signal transmission line.

The above color film substrate, wherein
said shielding electrode is grounded; or
said shielding electrode is externally connected to the common electrode.

A touch liquid crystal display device comprising the above touch liquid crystal display panel.

Compared with the prior art, the present disclosure through setting a shielding electrode between the GOA circuit of the array substrate and the touch signal transmission line of the color film substrate, utilizes the shielding electrode to shield the interference caused by the clock signal of said GOA circuit to the touch sensing signal on said touch signal transmission line, thereby improving the touch performance of touch screen.

DETAILED DESCRIPTION

In order to solve the technical problems in the prior art, and make technical solution and advantages of the present disclosure more apparent, the present disclosure will be specifically described below in conjunction with the accompanying drawings and particular embodiments.

In order to solve the existing interference caused by the clock signal of the GOA circuit on the array substrate to the touch sensing signal on the touch signal transmission line on the color film substrate, the embodiments of the present disclosure provide a touch liquid crystal display panel including an array substrate and a color film substrate, on said array substrate being formed a GOA circuit, at the outer side of said color film substrate being formed a touch signal transmission line, said touch liquid crystal display panel further comprises a shielding electrode located between said GOA circuit and said touch signal transmission line. In this way, the interference caused by the clock signal of said GOA circuit to the touch sensing signal on said touch signal transmission line can be shielded utilizing said shielding electrode, thereby improving the touch performance of touch screen.

Two specific embodiments of the present disclosure are given below.

Embodiment 1

Figure 1:
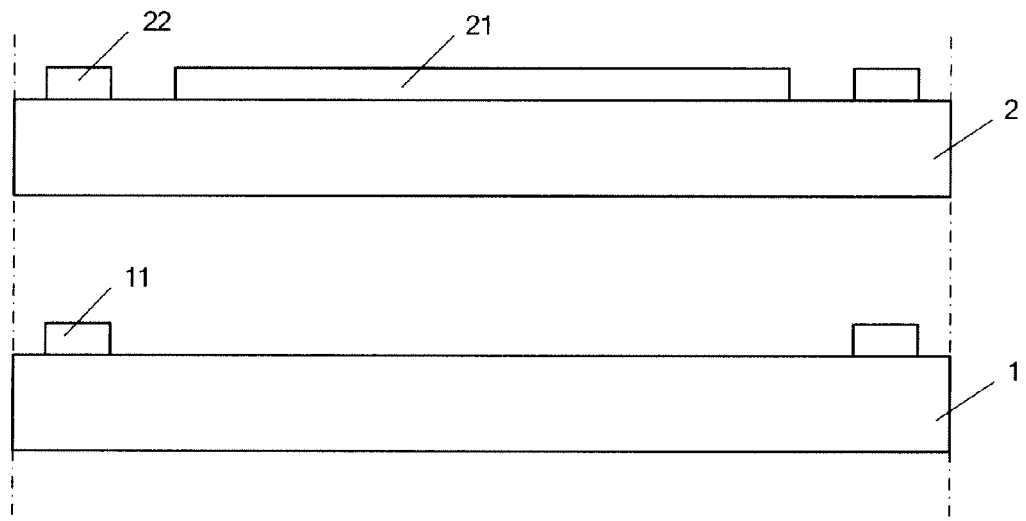
FIG. 1 is a schematic diagram of the structure of a touch liquid crystal display panel according to the prior art.
Figure 2:
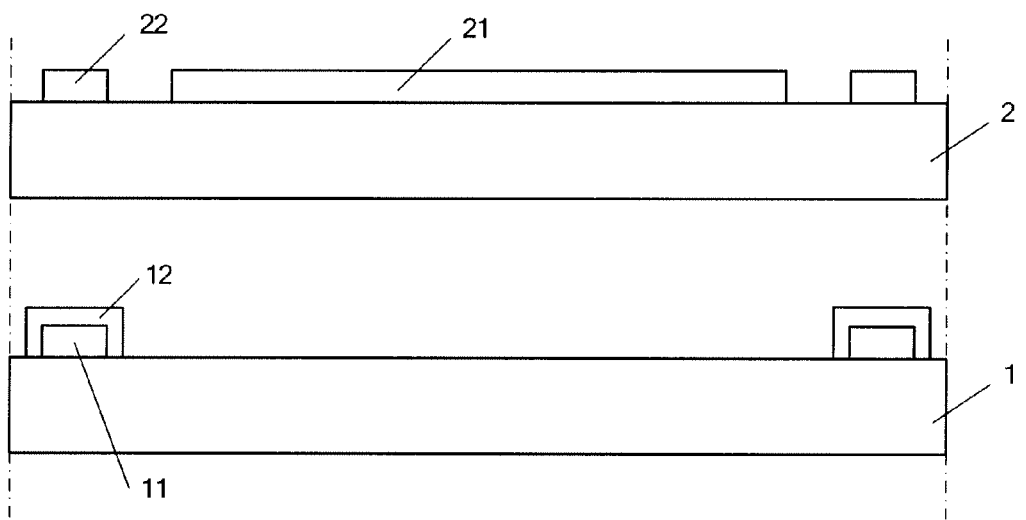
FIG. 2 is a schematic diagram of the structure of a touch liquid crystal display panel according to embodiment 1 of the present disclosure.

FIG. 2 is a schematic diagram of the structure of a touch liquid crystal display panel according to embodiment 1 of the present disclosure. Referring to FIG. 2, said touch liquid crystal display panel includes an array substrate 1 and a color film substrate 2, wherein:

at the outer side of said color film substrate 2 remote from the array substrate 1 is formed a touch electrode unit 21 and a touch signal transmission line 22, said touch signal transmission line 22 being located in the non-display area of said color film substrate 2;

On said array substrate 1 is formed a GOA circuit 11, said GOA circuit 11 is formed in the non-display region of the array substrate 1, and on said GOA circuit 11 is covered with a shielding electrode 12, said shielding electrode 12 is used for shielding the interference caused by the clock signal of said GOA circuit 11 to the touch sensing signal on said touch signal transmission line 22.

The touch liquid crystal display panel may be a liquid crystal display panel in an ADS mode, and said shielding electrode 12 may be grounded; or, said shielding electrode 12 may be connected to the common electrode on said array substrate 1, so that the interference caused by the clock signal of said GOA circuit 11 to the touch sensing signal on said touch signal transmission line can be shielded utilizing said shielding electrode 12, thereby improving the touch performance of touch screen.

Wherein said shielding electrode 12 may be made of a transparent conductive material or a metal material. Said transparent conductive material may be indium tin oxide (ITO), indium zinc oxide (IZO), indium tin zinc oxide (ITZO), and antimony tin oxide (ATO) and the like; said metal material may be silver (Ag), gold (Au), tungsten (W), titanium (Ti) and molybdenum (Mo) and the like.

Embodiment 2

Figure 3:
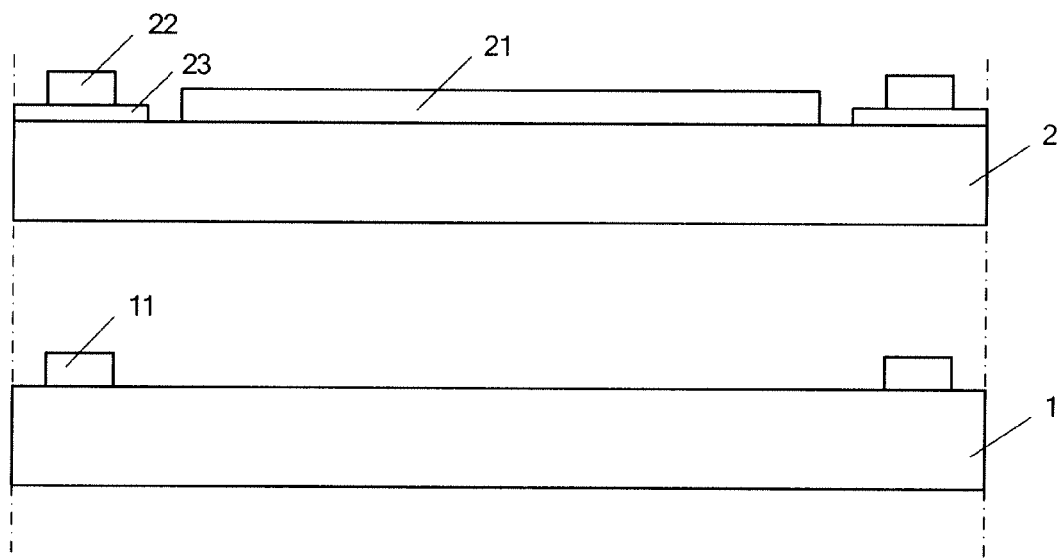
FIG. 3 is a schematic diagram of the structure of a touch liquid crystal display panel according to embodiment 2 of the present disclosure.

FIG. 3 is a schematic diagram of the structure of a touch liquid crystal display panel according to embodiment 2 of the present disclosure. Referring to FIG. 3, said touch liquid crystal display panel includes an array substrate 1 and a color film substrate 2, wherein:

on said array substrate 1 is formed a GOA circuit 11, and said GOA circuit 11 is formed in the non-display region of the array substrate 1;

at the outer side of said color film substrate 2 is formed a touch electrode unit 21 and a touch signal transmission line 22, said touch signal transmission line 22 being located in the non-display region of the color film substrate 2, and underneath the touch signal transmission line 22 being also formed a shielding electrode 23, said shielding electrode 23 being used for shielding the interference caused by the clock signal of said GOA circuit 11 to the touch sensing signal on said touch signal transmission line 22.

The touch liquid crystal display panel may be a liquid crystal display panel in an ADS mode, and said shielding electrode 12 may be grounded; or, said shielding electrode 12 may be externally connected to the common electrode. In this way, the interference caused by the clock signal of said GOA circuit 11 to the touch sensing signal on said touch signal transmission line can be shielded utilizing said shielding electrode 12, thereby improving the touch performance of touch screen.

Wherein said shielding electrode 12 may be made of a transparent conductive material or a metal material. Said transparent conductive material may be indium tin oxide (ITO), indium zinc oxide (IZO), indium tin zinc oxide (ITZO), and antimony tin oxide (ATO) and the like; said metal material may be silver (Ag), gold (Au), tungsten (W), titanium (Ti) and molybdenum (Mo) and the like.

Further, the present disclosure also provides a touch liquid crystal display device, comprising the aforesaid touch liquid crystal display panel. Specifically, said touch liquid crystal display device can be a LCD TV, a mobile phone, a LCD display, a digital photo frame, a tablet computer and the like, and any touch liquid crystal display devices with a touch function.

Finally, it should be noted that the above embodiments are merely used to illustrate but not to limit the technical solution of the present disclosure. It should be appreciated by an ordinary skilled person in the art that modifications or equivalent replacements can be made to the technical solution of the present disclosure without departing from spirit and scope of the technical solution of the present disclosure, all of which should fall into the scope of the claims of the present disclosure.

What is claimed is:

1. A touch liquid crystal display panel, comprising an array substrate and a color film substrate, on said array substrate being formed a GOA circuit, at an outer side of said color film substrate being formed touch signal transmission lines, wherein the GOA circuit is formed in a non-display area of the array substrate, and said touch signal transmission lines are located in a non-display area of said color film substrate, wherein said touch liquid crystal display panel further comprises:
    a shielding electrode located between said GOA circuit and said touch signal transmission lines, arranged only in the non-display area of the array substrate or only in the non-display area of said color film substrate, and configured to shield an interference caused by a clock signal of said GOA circuit on touch sensing signals of said touch signal transmission lines.

2. The touch liquid crystal display panel according to claim 1, wherein:
    said shielding electrode is located on said array substrate, and covers said GOA circuit.

3. The touch liquid crystal display panel according to claim 2, wherein:
    said shielding electrode is grounded; or
    said shielding electrode is connected to a common electrode on said array substrate.

4. The touch liquid crystal display panel according to claim 1, wherein:
    said shielding electrode is located at the outer side of said color film substrate and underneath said touch signal transmission lines.

5. The touch liquid crystal display panel according to claim 4, wherein:
    said shielding electrode is grounded; or
    said shielding electrode is externally connected to a common electrode.

6. A touch liquid crystal display device, wherein it includes the touch liquid crystal display panel recited in claim 1.

7. The touch liquid crystal display device according to claim 6, wherein:
    said shielding electrode is located on said array substrate, and covers said GOA circuit.

8. The touch liquid crystal display device according to claim 7, wherein:
    said shielding electrode is grounded; or
    said shielding electrode is connected to a common electrode on said array substrate.

9. The touch liquid crystal display device according to claim 6, wherein:
    said shielding electrode is located at the outer side of said color film substrate and underneath said touch signal transmission lines.

10. The touch liquid crystal display device according to claim 9, wherein:
    said shielding electrode is grounded; or
    said shielding electrode is externally connected to a common electrode.

11. An array substrate for a touch liquid crystal display panel, said touch liquid crystal display panel including said array substrate and a color film substrate, on said array substrate being formed a GOA circuit, at the outer side of said color film substrate being formed touch sensing lines, wherein the GOA circuit is formed in a non-display area of the array substrate, and said touch signal transmission lines are located in a non-display area of said color film substrate, wherein said array substrate further comprises:
    a shielding electrode covering said GOA circuit and arranged only in the non-display area of the array substrate, configured to shield an interference caused by a clock signal of said GOA circuit on touch sensing signals of said touch signal transmission lines.

12. The array substrate according to claim 11, wherein:
said shielding electrode is grounded; or
said shielding electrode is connected to a common electrode on said array substrate.

13. A color film substrate for a touch liquid crystal display panel, said touch liquid crystal display panel including an array substrate and said color film substrate, on said array substrate being formed a GOA circuit, at the outer side of said color film substrate being formed a touch signal transmission lines, wherein the GOA circuit is formed in a non-display area of the array substrate, and said touch signal transmission lines are located in a non-display area of said color film substrate, wherein said color film substrate further comprises:
    a shielding electrode located at the outer side of said color film substrate and underneath said touch signal transmission lines, wherein the shielding electrode is arranged only in the non-display area of the color film substrate, and configured to shield an interference caused by a clock signal of said GOA circuit on touch sensing signals of said touch signal transmission lines.

14. The color film substrate according to claim 13, wherein:
    said shielding electrode is grounded; or
    said shielding electrode is externally connected to a common electrode.

* * * * *